United States Patent
Theissen et al.

(10) Patent No.: US 11,458,598 B2
(45) Date of Patent: Oct. 4, 2022

(54) HOLDING HEAD FOR A VACUUM HOLDING DEVICE FOR HANDLING A PLATE-SHAPED WORKPIECE AND CORRESPONDING VACUUM HOLDING DEVICE

(71) Applicant: BOHLE AG, Haan (DE)

(72) Inventors: Marco Theissen, Wermelskirchen (DE); Edgar Hoehn, Haan (DE)

(73) Assignee: BOHLE AG, Haan (DE)

( * ) Notice: Subject to any disclaimer, the term of this patent is extended or adjusted under 35 U.S.C. 154(b) by 345 days.

(21) Appl. No.: 16/797,455

(22) Filed: Feb. 21, 2020

(65) Prior Publication Data

US 2020/0269391 A1 Aug. 27, 2020

(30) Foreign Application Priority Data

Feb. 22, 2019 (DE) ...................... 10 2019 104 590.8

(51) Int. Cl.
  *B66C 1/02* (2006.01)
  *B25B 11/00* (2006.01)
  *B23Q 7/04* (2006.01)

(52) U.S. Cl.
  CPC .............. *B25B 11/005* (2013.01); *B23Q 7/04* (2013.01); *B66C 1/0218* (2013.01); *B66C 1/0243* (2013.01); *B66C 1/0256* (2013.01)

(58) Field of Classification Search
  CPC ... B66C 1/0218; B66C 1/0243; B66C 1/0256; B25J 15/065; B25J 15/0658; B25J 15/0666; B25B 11/005; B23Q 7/04
  USPC .................................. 294/65, 185; 414/627
  See application file for complete search history.

(56) References Cited

U.S. PATENT DOCUMENTS

| 2,890,077 | A | * | 6/1959 | Littell | .................. | B66C 1/0212 |
| | | | | | | 414/737 |
| 3,423,119 | A | * | 1/1969 | Stanley | .................. | B65G 47/91 |
| | | | | | | 294/64.2 |
| 4,412,775 | A | * | 11/1983 | Molitor | ................. | B66C 1/0212 |
| | | | | | | 414/626 |
| 5,556,505 | A | * | 9/1996 | Hill | ................... | B32B 17/10036 |
| | | | | | | 414/793.1 |
| 8,226,072 | B2 | * | 7/2012 | Murayama | ............ | B66C 23/005 |
| | | | | | | 700/250 |
| 9,061,868 | B1 | * | 6/2015 | Paulsen | ..................... | B66D 3/18 |

FOREIGN PATENT DOCUMENTS

| CN | 104555433 A | | 4/2015 |
| CN | 205472213 U | | 8/2016 |
| DE | 20 2011 100 044 | * | 5/2012 |
| EP | 1314836 A2 | | 5/2003 |
| JP | 2000007147 A | | 1/2000 |
| WO | WO-2017178022 A2 | * | 10/2017 ........... B66C 1/0243 |

* cited by examiner

*Primary Examiner* — Dean J Kramer
(74) *Attorney, Agent, or Firm* — Harness, Dickey & Pierce, P.L.C.

(57) ABSTRACT

A holding head is provided for a vacuum holding device for handling a plate-shaped workpiece about an axis. An arrangement of operating elements on a base body of the holding head includes at least three operating elements connected as actuating elements in a double actuation circuit for releasing the plate-shaped workpiece. Two of the actuating elements are arranged on sides of the arrangement opposite to one another with respect to the position of the axis and the third actuating element is designed ring-shaped and surrounds the axis circumferentially.

10 Claims, 1 Drawing Sheet

Figure 1:
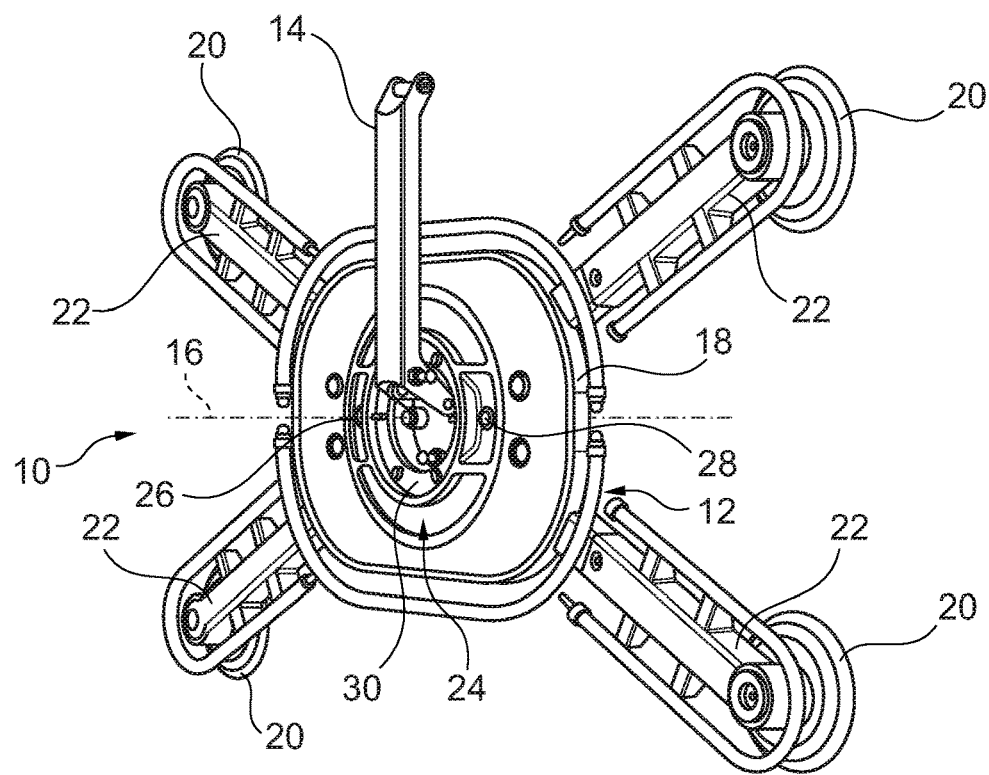

HOLDING HEAD FOR A VACUUM HOLDING DEVICE FOR HANDLING A PLATE-SHAPED WORKPIECE AND CORRESPONDING VACUUM HOLDING DEVICE

CROSS-REFERENCE TO RELATED APPLICATIONS

This application claims the benefit and priority of German patent application number DE 10 2019 104 590.8, filed on Feb. 22, 2019. The entire disclosure of the above application is incorporated herein by reference.

FIELD

The invention relates to a holding head for a vacuum holding device for handling a plate-shaped workpiece, in particular a glass plate, wherein the holding head is rotatably mounted with respect to an axis and comprises a base body with an arrangement of operating elements of a control system for controlling a vacuum system of the vacuum holding device, wherein the arrangement surrounds the axis, and at least one vacuum holding element mounted directly or indirectly on the base body for holding the plate-shaped workpiece.

The invention further relates to a corresponding vacuum holding device for handling a plate-shaped workpiece and an arrangement of operating elements on the base body of a holding head.

BACKGROUND

Vacuum holding devices for handling a plate-shaped workpiece are known as vacuum lifting devices (in short: vacuum lifters). They are suitable for handling large and flat, largely suction-tight workpieces, such as, for example: for handling and positioning glass plates and windows during the production, framing and assembly, for loading and unloading CNC laser cutting machines with metal sheets or for loading and unloading CNC processing machines with wooden or plastic plates.

There are various safety requirements for such vacuum lifting devices. These result, for example, from the European standard EN 13155:2003 (cranes—safety—loose load bearing center). Chapter 5 lists the safety requirements and safety measures. Point 5.2.2 in the standard lists "special requirements for vacuum lifting devices". Sub-item 5.2.2.9 describes the following requirement: "The release of the load has to be implemented by use of a control with double actuation. This is not necessary if a release of the load is not possible before the load is set down or in secure areas."

When handling plate-shaped workpieces, for example in handling and positioning of glass plates and windows during assembly, as many degrees of freedom of motion as possible are desired. However, the double actuation should be easy to perform in each position.

Document EP 1314836 A2 shows a holding head of a vacuum holding device for handling a glass plate, wherein the holding head is rotatably mounted with respect to an axis of rotation and comprises a base body with an arrangement of operating elements of a control system for controlling a vacuum system of the vacuum holding device, wherein the arrangement surrounds the axis of rotation, and a plurality of vacuum holding elements mounted directly or indirectly on the base body for holding the glass plate. The rotatable mounting is implemented by means of bearing means, which is arranged outside the axis of rotation and the arrangement of the operating elements. This rotatable bearing is quite complex and allows an expansion by additional degrees of freedom only with increased effort.

SUMMARY

It is an object of the invention to provide measures that enable a convenient operation of the prescribed control with double actuation with rotatably mounted holding heads.

According to the invention, the object is achieved by the features of the independent claims. Advantageous embodiments of the invention are specified in the dependent claims.

In the holding head according to the invention for a vacuum holding device for handling a plate-shaped workpiece which is rotatably mounted with respect to an axis and comprises a base body with an arrangement of operating elements of a control system for controlling a vacuum system of the vacuum holding device, wherein the arrangement surrounds the axis, and at least one vacuum holding element mounted directly or indirectly on the base body for holding the plate-shaped workpiece, it is provided that at least three of the operating elements are connected as actuating elements in a double actuation circuit for releasing the plate-shaped workpiece, wherein the first two of the actuating elements are disposed on sides of the arrangement opposite to one another with respect to the position of the axis and the third actuating element is formed ring-shaped and surrounds the axis circumferentially. This configuration and arrangement of the actuating elements enables to operate the double actuation circuit without problems at any angular position of the holding head, because even if the holding head is mounted close to the axis, at least one of the first two actuating elements and at least one segment of the third actuating element should always be accessible.

Said mounting close to the axis, that is to say a rotatable mounting which is in the region of the axis of rotation, can be expanded relative easily by further degrees of freedom of motion.

In the holding head the actuating elements are in particular connected in such a way that the actuation of the first and/or the second actuating element releases a locking of the third actuating element and releases this third actuating element for actuation. Normally, a locking mechanism is provided for the releasable locking of the third actuating element. The third actuating element, if actuated, then triggers the "release of the load".

According to an advantageous embodiment of the invention, it is provided that the ring-shaped third actuating element can be actuated by rotating. The rotation takes place in particular with a rotational movement along the ring-shaped structure.

According to a further advantageous embodiment of the invention, it is provided that the first actuating element, the axis and the second actuating element are arranged on an imaginary straight line. Here, each of the first two actuating elements, that is to say the first and the second actuating element, has in particular the same distance from the axis. In other words, the first two actuating elements have point symmetry with respect to the axis.

In the holding head, it is in particular provided that the first and/or the second actuating element is/are designed as a push switch, in particular as a push button. Such switches/ buttons are proven standard actuators.

According to an advantageous embodiment of the holding head according to the invention it is provided that the first two actuating elements are arranged outside the ring-shaped third actuating element. This arrangement of the actuating elements is favoured by many operators/users in a double actuation circuit.

In the vacuum holding device according to the invention for handling a plate-shaped workpiece, in particular a glass plate, comprising a vacuum system, a control system for controlling the vacuum system and a holding head rotatably mounted with respect to an axis it is provided that the holding head is designed as the holding head mentioned above.

According to an advantageous embodiment of the vacuum holding device according to the invention it is provided that it has an arm at which the holding head is rotatably mounted. Here, it is in particular provided that the holding head at the arm is also pivotably mounted with respect to at least one further axis.

In the arrangement of operating elements according to the invention on the base body of a holding head for a vacuum holding device for handling a plate-shaped workpiece around an axis it is provided that at least three of the operating elements are connected as actuating elements in a double actuation circuit for releasing the plate-shaped workpiece, wherein the first two of the actuating elements are arranged on opposite sides of the arrangement with respect to the position of the axis, and the third actuating element is configured in a ring shape and surrounds the axis circumferentially. This configuration and arrangement of the actuating elements enables to operate the double actuation circuit without problems at any angular position of the holding head even if the holding head is mounted close to the axis.

The embodiments of the invention mentioned in connection with the holding head which relate to the operating elements arranged on the base body are also intended to apply in the same way to the arrangement of these operating elements on the base body of the holding head.

FIGURES

Figure 2:
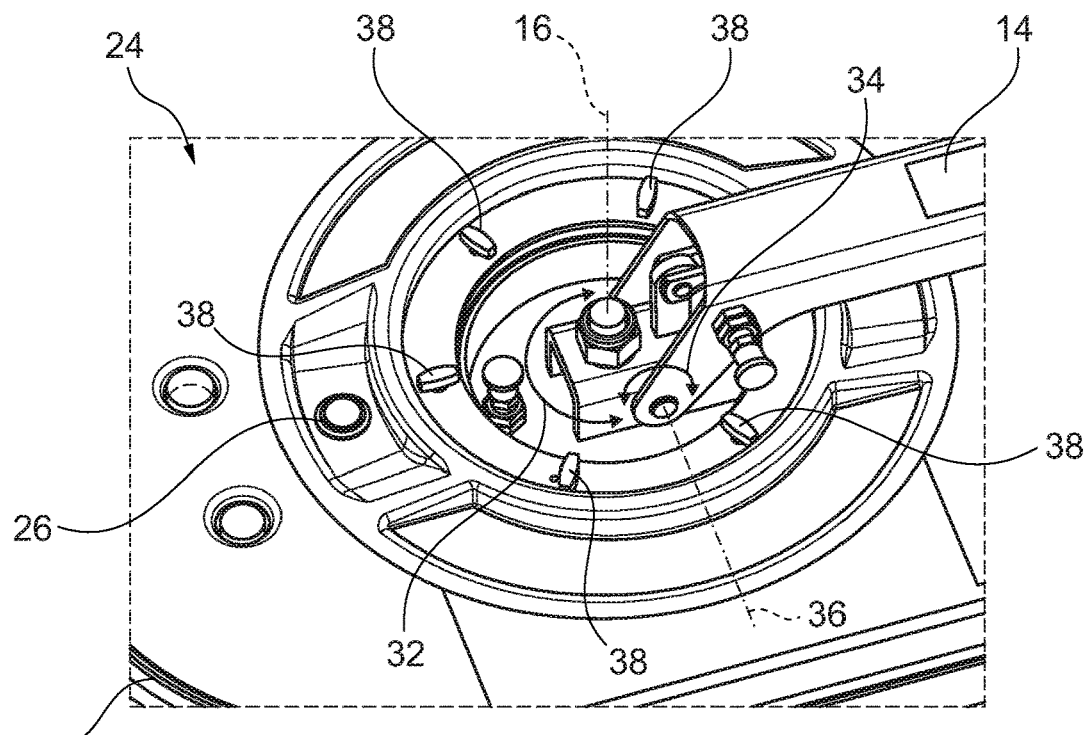

In the following, the invention is explained by way of example with reference to the attached drawings based on preferred exemplary embodiments, wherein the features shown below may represent an aspect of the invention both individually and in combination. In the drawing:

FIG. 1 shows a vacuum holding device for handling a plate-shaped workpiece according to a preferred embodiment of the invention; and FIG. 2 shows a base body of the holding head of the vacuum holding device and the arrangement of operating elements on this base body.

DETAILED DESCRIPTION

FIG. 1 shows a vacuum holding device 10 for handling a plate-shaped workpiece (not shown) such as a glass plate. The vacuum holding device 10 comprises parts of a corresponding vacuum system and a control system for controlling the vacuum system, and as mechanical components: a holding head 12 and an arm 14 carrying the holding head 12. The holding head 12, which essentially extends in one plane, is mounted at the arm 14 so that it can be rotated about an axis 16. The axis 16 passes in the middle through a central component of the holding head 12—the base body 18—and is oriented perpendicular to said plane. The arm 14 can be attached to a crane hook of a crane, for example.

In addition to this base body 18 the holding head 12 comprises a plurality (in the example, four) vacuum holding elements 20 for holding the plate-shaped workpiece which are indirectly mounted on the base body 18. For this purpose, the holding head 12 comprises four support arms 22 projecting outwards from the base body 18, on the free ends of which the vacuum holding elements 20 are arranged. The vacuum areas of these vacuum holding elements 20 are all arranged on one side of the plane. In the diagram of FIG. 1 this is the rear side. On the front side of the base body 18 there is an arrangement 24 of operating elements 26, 28, 30 of the control system for controlling said vacuum system, wherein the arrangement surrounds the axis 16. In addition to the operating elements not further described here, these are the actuating elements 26, 28, 30 of a double actuation circuit for releasing the plate-shaped workpiece, that is to say actuating elements 26, 28, 30 connected in this circuit. The actuating elements 26, 28, 30 are arranged such that the first two actuating elements 26, 28 are arranged on sides or half-planes of the arrangement 24 opposite to one another with respect to the position of the axis 16, and such that the ring-shaped third actuating element 30 surrounds the axis 16 circumferentially.

By means of a corresponding double actuation of these actuating elements 26, 28, 30 a ventilation of the vacuum areas of the vacuum holding elements 20 is caused.

Due to a safety requirement for such vacuum holding devices 10 (and also other vacuum lifting devices) the release of the load, that is to say the plate-shaped workpiece, has to be effected by a control with double actuation. In the present case, this requirement/regulation is met by connecting the actuating elements 26, 28, 30 in such a way that the actuation of the first and/or the second actuating element 26, 28 releases a locking of the third actuating element 30 and releases it for actuation. If subsequently the third actuating element 30 is actuated, there is certainly a double actuation and the vacuum system is controlled so that the vacuum areas of the vacuum holding elements 20 are vented, which results in the release of the plate-shaped workpiece, i.e. the load, from the holding head 12.

The holding head 12 further comprises a plurality of railings on its front side, wherein a respective one of these railings surrounds the base body 18 and the support arms 22. The operator/user can grip and move the holding head well via these railings.

FIG. 2 shows the mounting of the holding head 12 at the arm 14 and the arrangement 24 of the operating elements 26, 28, 30 of the control system for controlling the vacuum system in more detail.

On the front side of the holding head 12 facing the operator it is mounted at the level of the axis 16 at the end of the arm 14. The mounting is carried out in such a way that the holding head 12 is mounted rotatable with respect to the axis 16 (double arrow 32) and also pivotable with respect to at least one further axis 36 (double arrow 34). The two axes 16, 36 are perpendicular to each other. With such a mounting it is therefore possible that individual operating elements, in particular also actuating elements 26, 28, 30 of the holding head 12 are completely or partially covered by the arm 14 when the holding head 12 is in a corresponding angular position.

In order to enable a comfortable actuation of the double actuation circuit in any angular position of the holding head 12 for the operator, the actuating elements 26, 28, 30 are arranged and designed as follows:

The first two of the three actuating elements 26, 28 connected in the double actuation circuit for releasing the plate-shaped workpiece are arranged on half planes of the arrangement 24 opposite to one another with respect to the position of the axis 16 and are designed as push switches. The third actuating element 30 is configured in a ring shape, can be actuated by rotating it along its ring-shaped structure and is arranged around the axis 16. Distributed circumferentially on the ring-shaped base structure of the third actuating element 30 this comprises handles 38. The position of the axis 16 forms the center of the ring-shaped structure of the third actuating element 30 and the two first actuating elements 26, 28 are arranged outside the ring-shaped third actuating element 30 such that the first actuating element 26, the axis 16 and the second actuating element 28 are disposed on an imaginary straight line, wherein the first two actuating elements 26, 28 are disposed at the same distance from the axis 16.

In the holding head 12, the three actuating elements 26, 28, 30 are connected such that the actuation of the first and/or the second actuating element 26, 28 releases a locking of the third actuating element 30 and releases this third actuating element 30 for actuation. A locking mechanism is provided for the releasable locking of the third actuating element 30, but is not visible in this illustration. A valve (not shown) can now be actuated with the third actuating element 30, via which the vacuum areas of the vacuum holding element 20 are ventilated.

The actuating elements 26, 28, 30 can thus be described as follows:

The arrangement 24 of the actuating elements 26, 28, 30 is symmetrical, central and always visible or accessible. In no situation the actuating elements 26, 28, 30 can be covered by the arm 14 in such a way that a double actuation would not be possible.

What is claimed is:

1. A holding head for a vacuum holding device for handling a plate-shaped workpiece, wherein the holding head is rotatably mounted with respect to an axis and comprises a base body with an arrangement of operating elements of a control system for controlling a vacuum system of the vacuum holding device, wherein the arrangement surrounds the axis, and at least one vacuum holding element mounted directly or indirectly on the base body for holding the plate-shaped workpiece,
wherein
at least three of the operating elements are connected as actuating elements in a double actuation circuit for releasing the plate-shaped workpiece by venting a vacuum area associated with the at least one vacuum holding element, wherein the first two of the actuation elements are arranged on sides of the arrangement opposite to one another with respect to the position of the axis and the third actuating element is configured ring-shaped and surrounds the axis circumferentially.

2. The holding head according to claim 1, wherein the actuating elements are connected such that the actuation of the first and/or the second actuating element releases a locking of the third actuating element and releases it for actuation.

3. The holding head according to claim 1, wherein the ring-shaped third actuating element can be actuated by rotating.

4. The holding head according to claim 1, wherein the first actuating element, the axis and the second actuating element are arranged on an imaginary straight line, wherein the two actuating elements in particular have the same distance from the axis.

5. The holding head according to claim 1, wherein the first and/or the second actuating element is/are designed as a push switch.

6. The holding head according to claim 1, wherein the first two actuating elements are arranged outside the ring-shaped third actuating element.

7. A vacuum holding device for handling a plate-shaped workpiece, comprising a vacuum system, a control system for controlling the vacuum system and a holding head according to claim 1 which is rotatably mounted with respect to an axis.

8. The vacuum holding device according to claim 7, further comprising an arm at which the holding head is rotatably mounted.

9. The vacuum holding device according to claim 8, wherein the holding head is also mounted at the arm pivotally with respect to at least one further axis.

10. An arrangement of operating elements on a base body of a holding head for a vacuum holding device for handling a plate-shaped workpiece, around an axis,
wherein
at least three of the operating elements are connected as actuation elements in a double actuation circuit for releasing the plate-shaped workpiece by venting a vacuum area associated with a vacuum holding element, wherein the first two of the actuating elements are arranged on sides of the arrangement opposite to one another with respect to the position of the axis and the third actuating element is designed in a ring shape and surrounds the axis circumferentially.

* * * * *